Feb. 6, 1923.
W. L. NINOW ET AL.
TRAP.
FILED JULY 13, 1920.
1,444,132
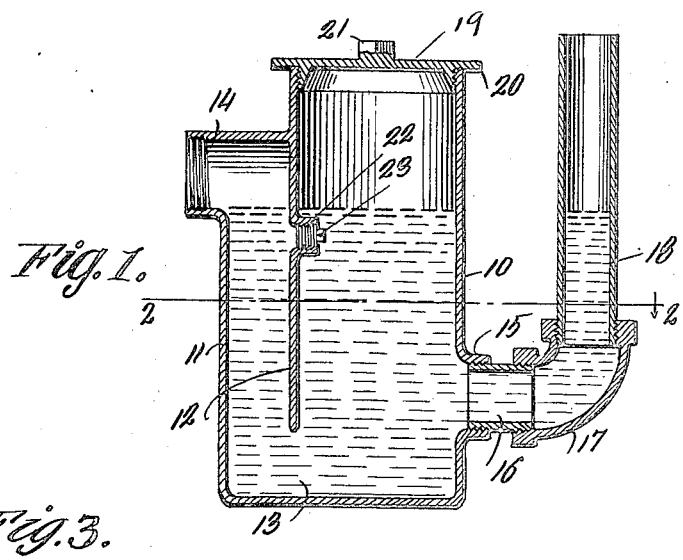
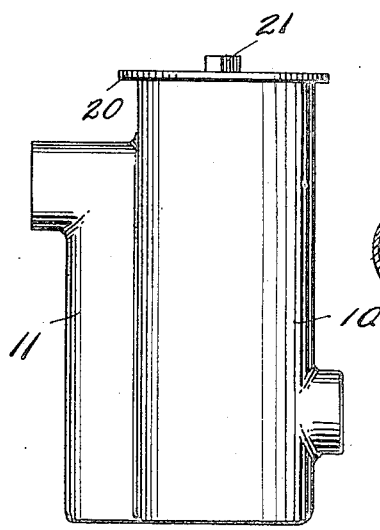
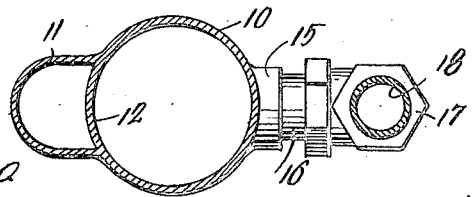
WITNESSES
WALTER L. NINOW   INVENTOR.
RICH. C. MITTELSTAEDT
BY
ATTORNEY.

Patented Feb. 6, 1923.

1,444,132

UNITED STATES PATENT OFFICE.

WALTER L. NINOW AND RICHARD C. MITTELSTAEDT, OF MILWAUKEE, WISCONSIN.

TRAP.

Application filed July 13, 1920. Serial No. 395,822.

*To all whom it may concern:*

Be it known that we, WALTER L. NINOW and RICHARD C. MITTELSTAEDT, citizens of the United States, residing at Milwaukee, in the county of Milwaukee and State of Wisconsin, have invented certain new and useful Improvements in Traps, of which the following is a specification.

This invention relates to traps and has for its object the production of a simple and efficient trip especially adapted for use in connection with waste-pipes for preventing the escape of sewer gases.

Another object of this invention is the production of a simple and efficient trap having a deep water-seal, and having the inlet and outlet openings formed near the bottom of the trap in such a manner as to prevent sewer gas escaping into a room even should the cover be entirely removed from the trap while cleaning.

With these and other objects in view, this invention consists of certain novel construction, combinations and arrangement of parts which will be hereinafter fully described and claimed.

In the drawings:—

Figure 1 is a vertical section through the trap, and

Figure 2 is a section taken on line 2—2 of Figure 1 looking in the direction of the arrow.

Figure 3 is a side elevation of the trap and

Figure 4 is a vertical section through a portion of the trap showing the tapering plug used in connection therewith.

By referring to the drawings, it will be seen that 10 designates the body of the trap which comprises a substantially vertically arranged tubular body having a vertically extending tubular member 11 formed integral with the body 10 and separated from communication with the body by means of the wall 12. This wall 12 terminates short of the bottom of the body 10 thereby producing an outlet opening 13 between the tubular member 11 and the body 10 as clearly shown in Figure 1 of the drawing. This tubular member 11 extends vertically of the body 10 to a point near the top of the top of the body or cylinder 10 and is then turned at right angles therefrom for the purpose of producing an outlet neck portion 14.

The body 10 is also provided with an integral collar 15 near the lower end thereof upon one side thereof diametrically opposite the tubular member 11 as clearly shown in Figures 1 and 2 of the drawing. A pipe section 16 is threaded within the collar 15 and this pipe section 16 carries an elbow 17, the elbow 17 supporting the inlet pipe 18, the inlet pipe extending preferably a vertical direction with respect to the elbow 17 and in the same vertical plane with the body 10.

The cover 19 is threaded or otherwise secured in the upper end of the body 10 and this cover 19 is provided with an overhanging flange 20, the flange 20 projecting beyond the sides of the body 10 to facilitate the removal of the cover from the body 10 when it is so desired. A suitable polygonal head 21 is formed upon the top of the cover 19 to facilitate the rotation thereof within the upper end of the body 10 whereby the cover may be threaded into or out of engagement with the body 10.

The wall 12 which is formed between the body 10 and the tubular member 11, is provided with a collar portion 22. A suitable plug 23 may be threaded or otherwise secured within the collar portion 22 and it is desired to point out that this collar portion 22 and plug carried thereby are located directly below the water level of the trap or in other words, the collar 22 is formed in the wall 12 at a point below the lower edge of the discharge or outlet opening formed in the neck 14. Consequently, should the plug 23 become loosened or detached from the collar 22 by accident or other inadvertence, the water seal will prevent the escape of gases through the open end of the body 10 should the cover 19 be removed therefrom.

It should be understood that the purpose of the plug 23 is to permit the waste pipe leading from the trap to be cleaned out in case of stoppage by the insertion of a wire or other suitable tool through the collar 22 and through the neck 14.

It is desired to reiterate the fact that it is important that the inlet and outlet openings formed in the body 10 be located near the bottom of the body so as to at all times insure the complete water seal within the body of the trap and in this way prevent the escape of sewer gases into a room should the cover 19 be temporarily removed or accidentally displaced from the body 10. As shown in Figure 4 a tapering plug 23′ may be employed in place of the straight threaded plug 23 shown in Figure 1.

Having described our invention, what we claim as new is:

As a new article of manufacture, a waste pipe trap comprising a cylindrical body portion having its upper end open, a vertically disposed tubular extension formed on one side of the body and extending from the extreme lower end thereof to a point short of the upper end thereof, a laterally extending neck portion formed on the upper extremity of the tubular extension for producing an outlet opening, an inlet pipe communicating with the body adjacent to the lower end thereof and at a point diametrically opposite to the vertically disposed tubular extension, a separating wall disposed between said body and said tubular extension and terminating short of the lower end of said body for producing a communicating opening between said body and said tubular extension, whereby a water seal may be maintained at all times within said body to a point on a plane horizontal with the lower edge of the discharge opening formed by said laterally extending neck, a cover detachably asociated with the open end of the body, the separating wall having a hand-hold formed therein below the water line and adjacent to said outlet neck, and a removable plug for said hand-hold.

In testimony whereof we affix our signatures in presence of two witnesses.

WALTER L. NINOW.
RICHARD C. MITTELSTAEDT.

Witnesses:
HERBERT R. ADDICKS,
GEORGE R. STOLZ, Jr.